United States Patent [19]
Moser

[11] Patent Number: 5,975,265
[45] Date of Patent: Nov. 2, 1999

[54] FABRICATION OF FLUID COUPLING

[75] Inventor: George Moser, Wixom, Mich.

[73] Assignee: Behr America, Inc., Walled Lake, Mich.

[21] Appl. No.: 09/103,885

[22] Filed: Jun. 24, 1998

[51] Int. Cl.[6] .................................................. F16D 35/02
[52] U.S. Cl. .................................. 192/58.41; 192/113.21; 192/58.681
[58] Field of Search ................................ 192/58.41, 58.4, 192/58.64, 58.65, 58.66, 58.67, 58.9, 113.21, 58.681

[56] References Cited

U.S. PATENT DOCUMENTS

| | | |
|---|---|---|
| Re. 25,481 | 11/1963 | Weir . |
| 2,662,625 | 12/1953 | Fawick . |
| 3,007,560 | 11/1961 | Weir . |
| 3,319,754 | 5/1967 | Kokochak et al. . |
| 3,498,272 | 3/1970 | Roper . |
| 3,575,269 | 4/1971 | Sherman . |
| 3,993,415 | 11/1976 | Hauser . |
| 4,181,205 | 1/1980 | Mennucci et al. . |
| 4,383,597 | 5/1983 | Blair ........................................ 192/58.4 |
| 4,496,034 | 1/1985 | Bopp . |
| 4,611,697 | 9/1986 | Okita et al. ........................ 192/113.21 |
| 4,899,860 | 2/1990 | Diederich . |
| 4,938,331 | 7/1990 | Ohmi et al. . |
| 5,111,923 | 5/1992 | Kennedy ................................. 192/58.4 |
| 5,277,289 | 1/1994 | Dax . |
| 5,404,977 | 4/1995 | Martin et al. ........................... 192/58.4 |
| 5,484,045 | 1/1996 | Kikuchi et al. ........................ 192/58.4 |
| 5,535,868 | 7/1996 | Hagiwara .............................. 192/58.65 |
| 5,601,170 | 2/1997 | Martin et al. ....................... 192/58.681 |

FOREIGN PATENT DOCUMENTS

| | | | |
|---|---|---|---|
| 35128 | 2/1989 | Japan .................................. 192/58 B |
| 2178141 | 2/1987 | United Kingdom ................ 192/58 B |

*Primary Examiner*—Richard M. Lorence
*Assistant Examiner*—Ha Ho
*Attorney, Agent, or Firm*—Howard & Howard

[57] ABSTRACT

A fluid coupling assembly 20, 120, 220, 320 and 420 of the type including a housing having spaced side walls 24, 124, 224 and 434 extending radially to an axis A and defining a fluid chamber surrounding a disc 30, 130 supported by a shaft 26 extending through and rotatably supported by one of the side walls with cooling fins for cooling the fluid chamber. A cooling sub-assembly 44, 46, 48, 144, 244, 246, 248, or 444 of cooling fins connected to a ring 50, 54, 58, 150, 250, 350, 450 and 472 is secured to the housing. The housing and/or the disc may be fabricated from sheet metal. The cooling sub-assemblies may be of various embodiments and a plurality of cooling sub-assemblies 44, 46, 48 may be attached to each housing.

13 Claims, 8 Drawing Sheets

FABRICATION OF FLUID COUPLING

TECHNICAL FIELD

The subject invention relates to a fluid coupling of the type for transmitting rotary motion between an internal combustion engine and the cooling fan which moves cooling air through the radiator for cooling the cooling fluid of the engine.

BACKGROUND OF THE INVENTION

Due to the high shear forces in such fluid couplings, significant amounts of heat is generated. In order to dissipate this heat, the housings of the fluid couplings are die cast with integral fins which act as heat sinks. The numerous and geometrically complex cooling fins cannot be manufactured economically with any process but die casting. However, die casting is an expensive process and often produces defective housings which leak. An example of such an assembly is shown in U.S. Pat. No. 5,277,289 to Dax. In addition to the heat dissipation, it is frequently desirous to maintain a narrow gap between the disc and side walls of the fluid coupling assembly as illustrated in U.S. Pat. No. 3,319,754 to Kokochak et al. Conventional clutches are die-cast and then machined to achieve the necessary tolerances. Considerable machining is needed because die-casting is an inaccurate process that typically generates parts that substantially deviate from the final desired result. An additional disadvantage of die-casting is the potential leaks in the clutch because of the porosity of the die-casting material. This porosity typically dictates the need to use an additional step in the manufacturing process called impregnation, whereby the die-cast and machined parts are immersed in a high temperature resin batch under pressure in order to seal the leaks in the material. Impregnation is expensive and slow. Despite its disadvantages and cost, the die-casting process is used in conventional clutches because of the need to provide cooling fins on the outside of the body of the clutch. Viscous clutches generate substantial heat internally because of the shear stress in the oil. This heat has to be transferred to the air surrounding the clutch, and this is possibly only by providing a sufficiently large heat exchange area, which is achieved with the cooling fins. Cooling fins cannot be machined because the amount of machining would make the clutch prohibitively expensive. The only possible solution so far has been to use die-cast those fins. That resolves the problem of the cooling fins, but it creates all the other problems mentioned above.

SUMMARY OF THE INVENTION AND ADVANTAGES

A fluid coupling assembly comprises a housing having spaced side walls extending transversely to an axis and defining a fluid chamber. A shaft extends through and is rotatably supported by one of the side walls and a disc is supported by the shaft in the chamber in spaced relationship to the side walls. Cooling fins are included for cooling the fluid chamber. The assembly is characterized by a cooling sub-assembly comprising a support member supporting the cooling fins independently of the housing with the cooling sub-assembly secured to the housing.

The invention also includes a method of assembling such an assembly including the steps of fabricating a cooling sub-assembly by connecting cooling fins and a support member, and securing the cooling sub-assembly to the housing.

The new method, which is the object of this invention, consists basically of making the clutch without fins (which eliminates the need to use die-casting) and then, in a second operation, mounting a set of cooling fins made separately onto the clutch. This separately made set of cooling fins can be made using different processes (such as aluminum extrusion, stamping, etc.).

Accordingly, the fluid couplings of the subject invention may be fabricated from a relatively inexpensive stamping, which alone do not have sufficient mass to inherently dissipate heat, but which are combined with separately fabricated cooling sub-assemblies. The fabrication process may be controlled to prevent leaks and a wide variety of components may be combined in various combinations to provide a wide variety of fluid coupling assemblies.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals, or numerals increased by one hundred, indicate like or corresponding parts throughout the several views, various embodiments and variations of the subject invention are shown.

Figure 1:
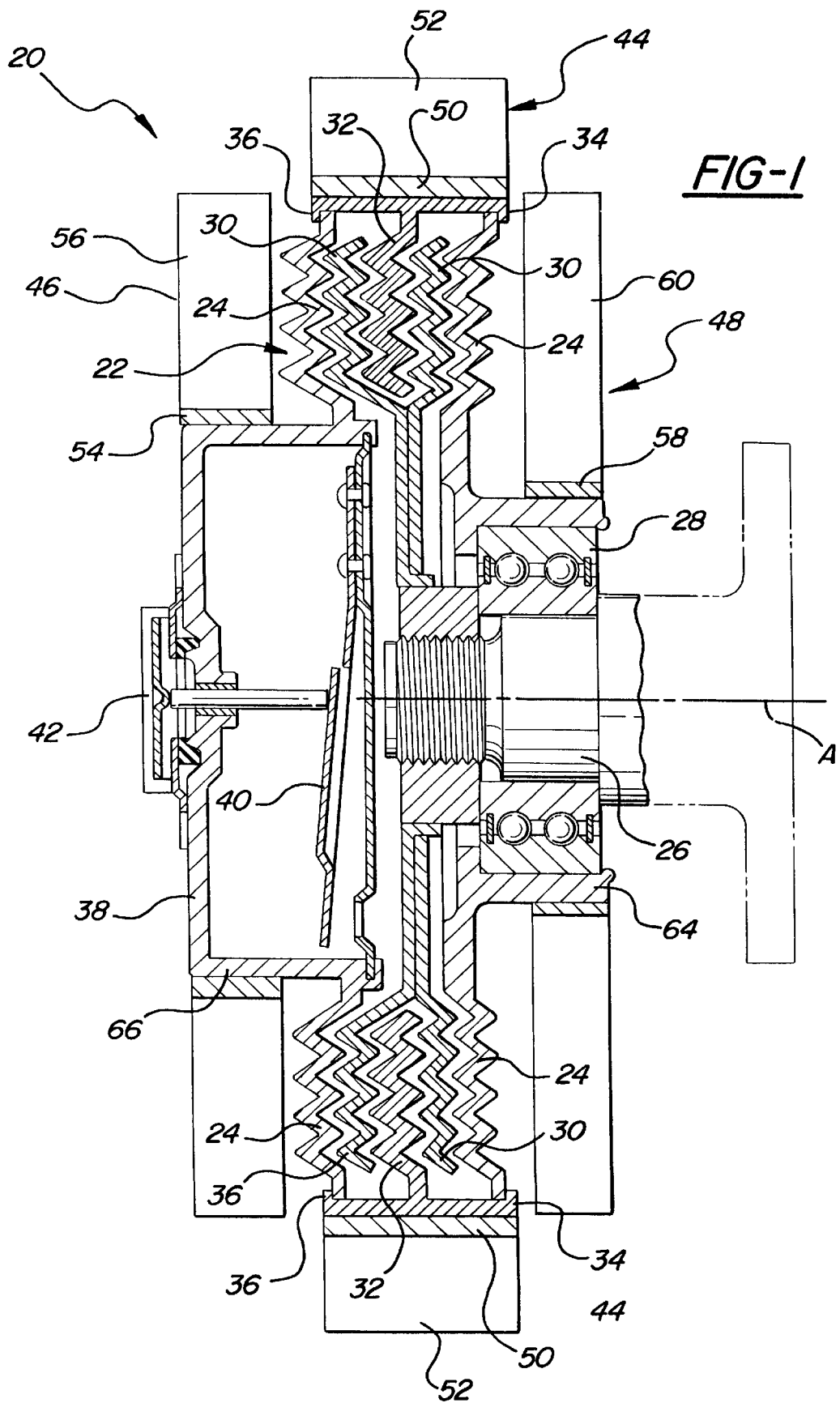
FIG. 1 is a cross sectional view of a first embodiment of the invention.

A first embodiment of a fluid coupling assembly constructed in accordance with the subject invention is generally shown at 20 in FIG. 1. The fluid coupling assembly 20 comprises a housing, generally indicated at 22, having spaced side walls 24 extending transversely to an axis A and defining a fluid chamber. A shaft 26 extends through and is rotatably supported by one of the side walls through a bearing 28. A plurality of discs 30 are supported by the shaft in the chamber in spaced relationship to the side walls. The housing and the discs are formed from stamped sheet metal components. During the stamping, the side walls and the discs have V-shaped undulations formed therein. The undulations have an axial extent, i.e., the V-shaped undulations extent a predetermined axial distance from apex to apex. However, the side walls and the discs, in which the undulations are formed, have respective thicknesses which are respectively less than the axial extent of the undulations. The undulations of the discs are sandwiched between and axially overlap the undulations of the side walls. However, in the embodiment of FIG. 1, a center plate 32 is sandwiched between the two discs, the plate being attached about its annular periphery to the housing. More specifically, the housing includes an annular cap 34 which extends axially between the side walls and includes radial flanges 36 overlapping the outside surfaces of the side walls and secured thereto by welding, brazing, or the equivalent thereof.

The housing also includes a fluid reservoir 38 for supplying fluid to the fluid chamber of the housing. A valve element 40 controls the flow of fluid between the housing and the reservoir and the position of the valve element is determined by a temperature responsive assembly 42. As alluded to above, the fluid coupling generates substantial heat and it is necessary to provide a heat sink to dissipate the heat.

Accordingly, the assembly includes cooling fins for cooling the fluid chamber. The assembly is characterized by one or more cooling sub-assemblies each of which comprises a support member supporting the cooling fins independently of the housing, but with the cooling sub-assembly being secured to the housing. The embodiment of FIG. 1 includes three cooling sub-assemblies respectively indicated at 44, 46 and 48.

Figure 2:
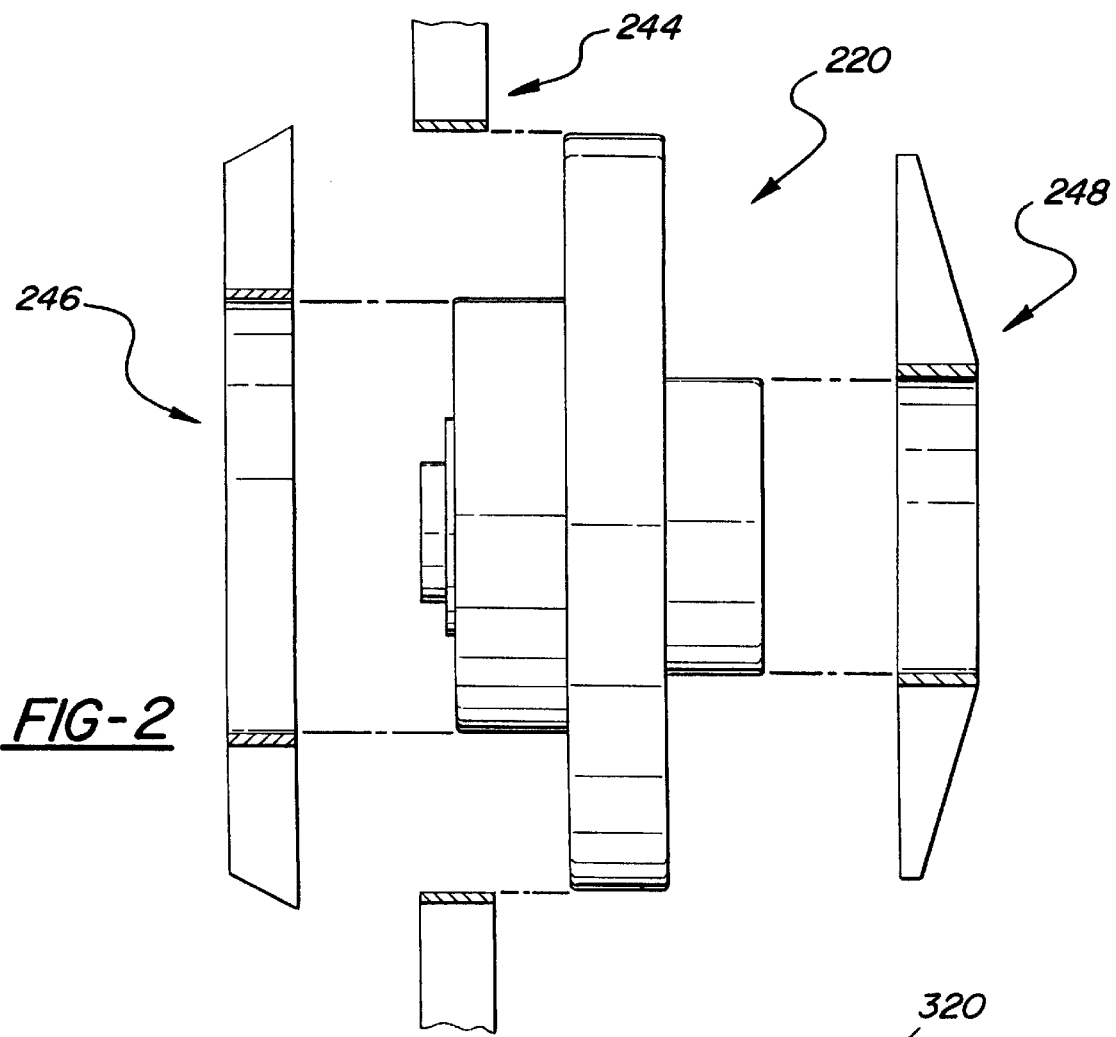
FIG. 2 is an exploded view partially in cross section of the embodiment of FIG. 1.
Figure 7:
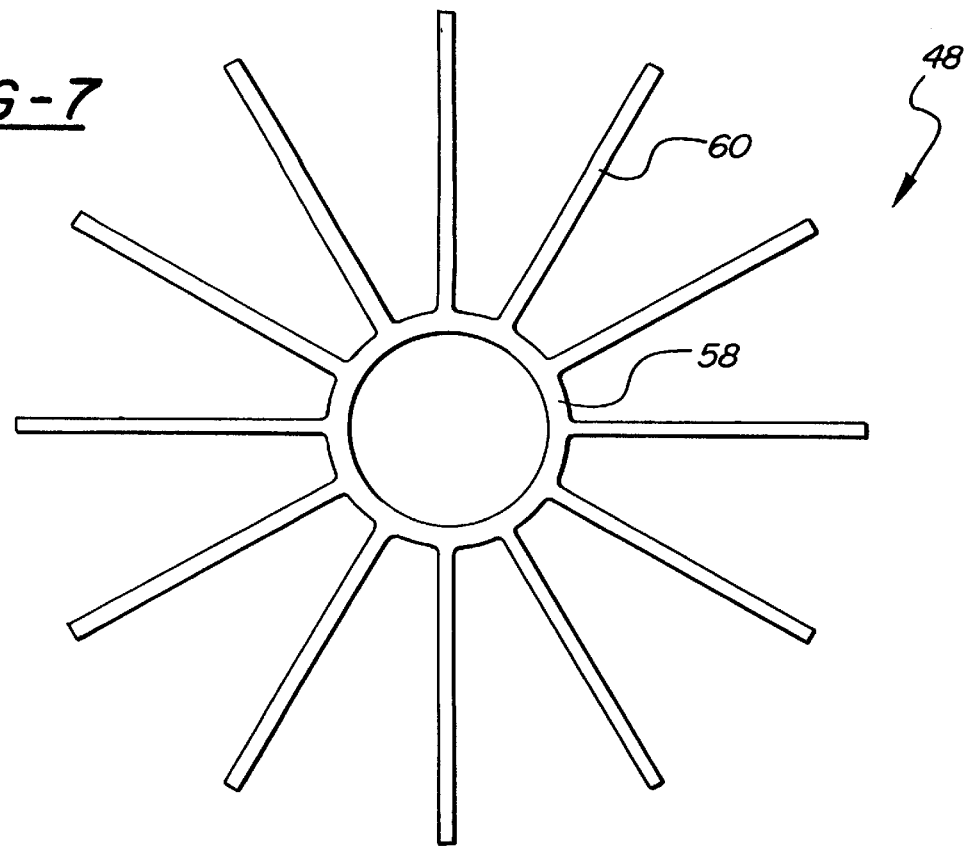
FIG. 7 is a side elevational view of a first cooling fin sub-assembly.
Figure 8:
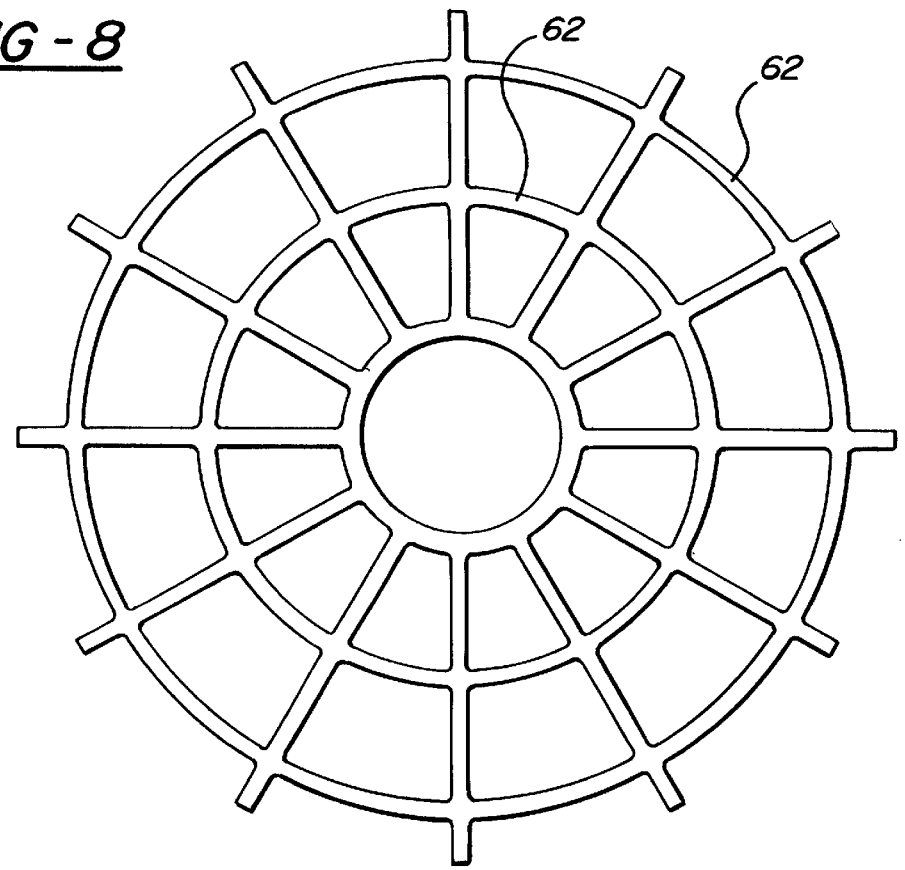
FIG. 8 is a side elevational view of a second cooling fin sub-assembly.
Figure 11:
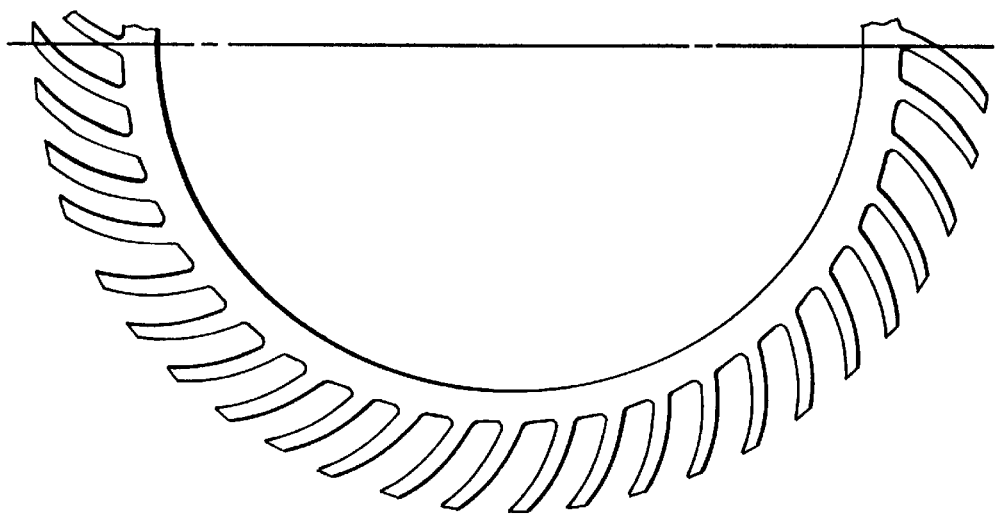
FIG. 11 is a fragmentary side elevational view of a fifth cooling fin sub-assembly.
Figure 10:
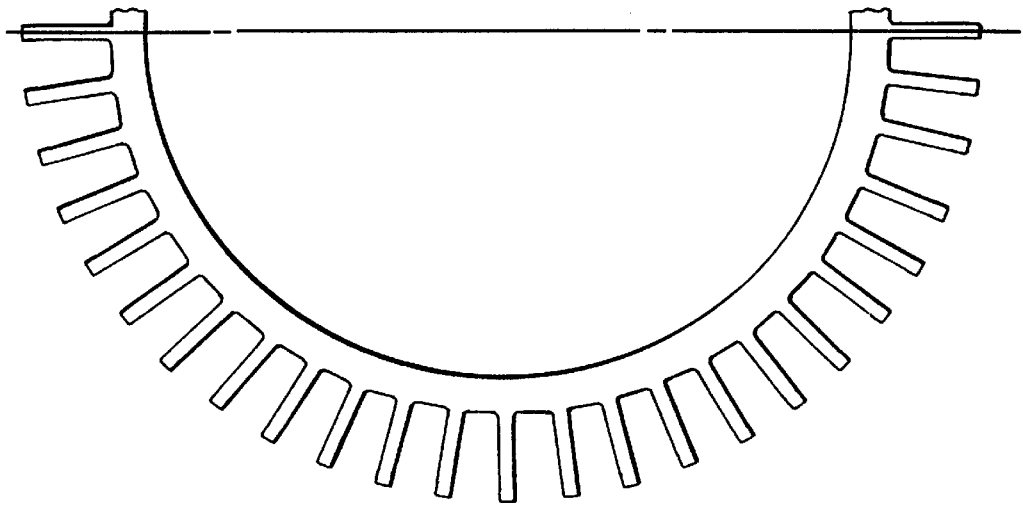
FIG. 10 is a fragmentary side elevational view of a fourth cooling fin sub-assembly.
Figure 9:
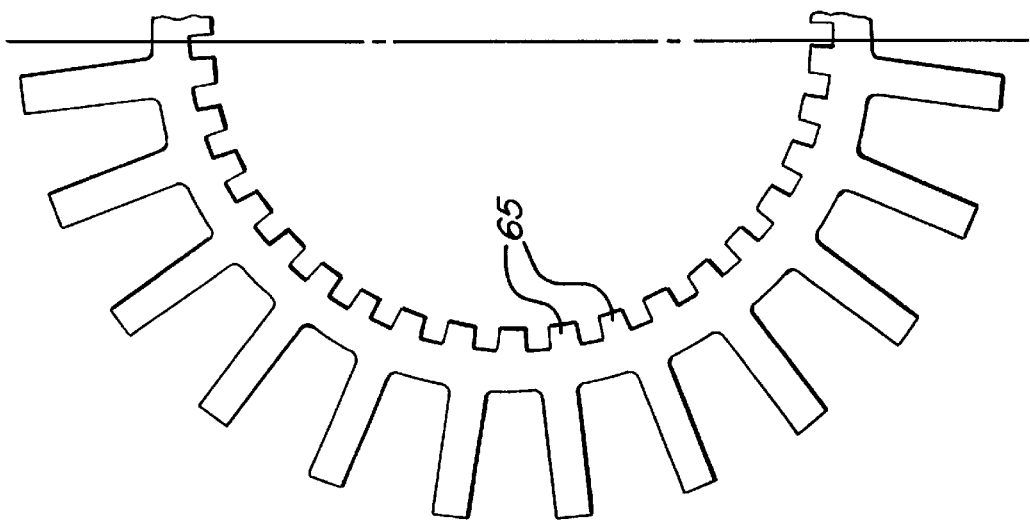
FIG. 9 is a fragmentary side elevational view of a third cooling fin sub-assembly.

In the center cooling sub-assembly 44, the support member comprises a ring 50 and cooling fins 52 extending generally radially of the ring 50. In the fan side cooling sub-assembly 46, the support member comprises a ring 54 and cooling fins 56 extending generally radially of the ring 54. In the engine side cooling sub-assembly 48, the support member comprises a ring 58 and cooling fins 60 extending generally radially of the ring 58. The cooling fins may be welded or brazed to the rings or, as shown in FIGS. 7 and 8, the ring and fins may be integrally formed as a homogenous unit. In addition, the cooling fins may be interconnected by supplemental annular rings 62 as shown in FIG. 8. As a variation, the cooling fins may be tapered on the sides as shown in FIG. 2. Similarly, variations of the center cooling sub-assemblies are shown in FIGS. 9 through 11. In FIG. 9, the ring is separated from the housing by spacing fins 65. FIG. 10 shows an integral center cooling sub-assembly whereas FIG. 11 shows a center cooling sub-assembly with the cooling fins spiraled for affecting airflow.

Figure 6:
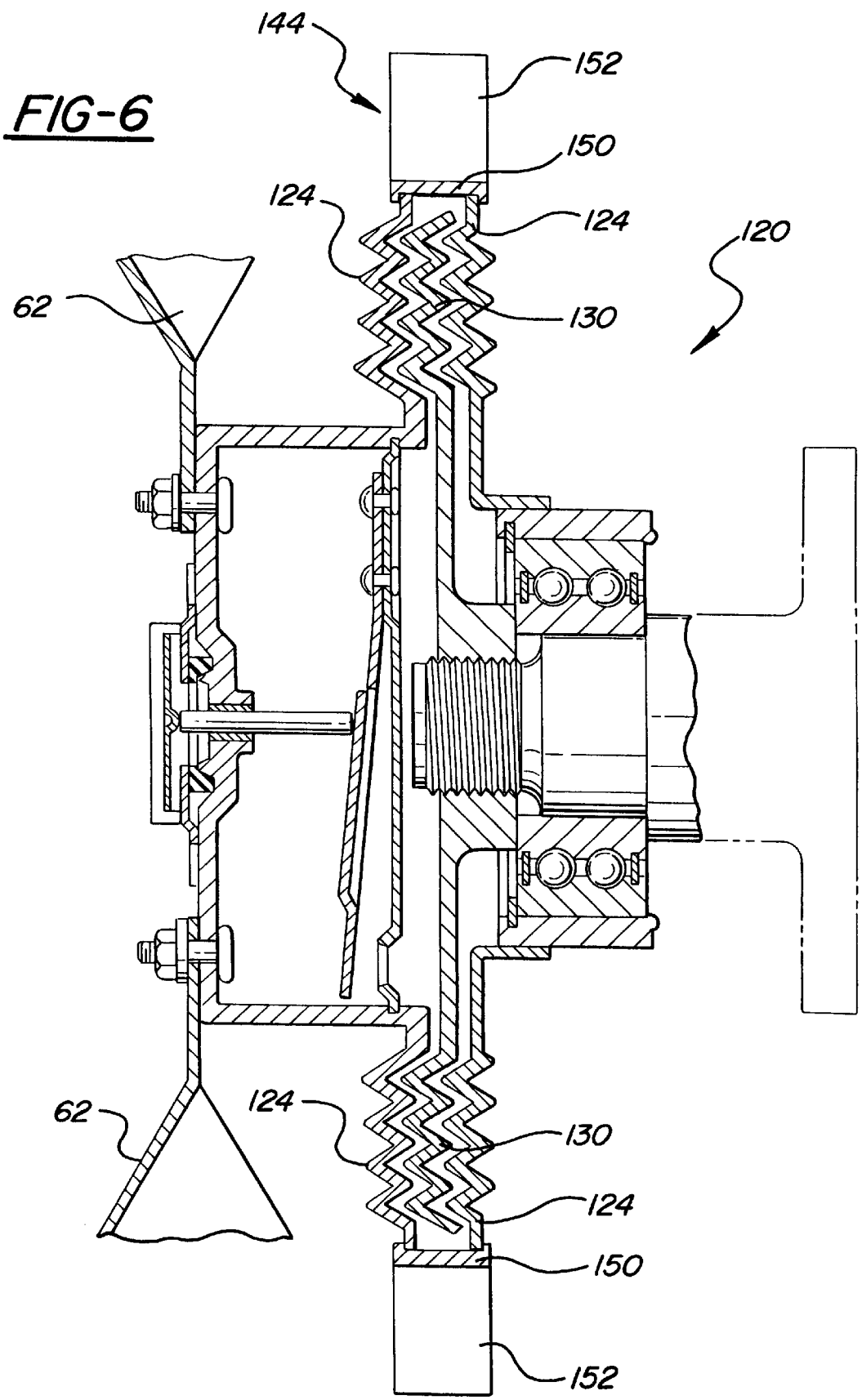
FIG. 6 is a cross sectional view of a second embodiment of the invention.

In all embodiments including a center cooling sub-assembly disposed about the housing, the ring thereof extends axially between the side walls of the housing, either attached to, as is the case in FIG. 1, or forming a part of the housing, as is the case in FIG. 6. As alluded to above, the housing in FIG. 1 includes an axially extending wall 34 and the ring 50 of the cooling sub-assembly is secured to this axially extending wall 34. In the center cooling sub-assembly 144 of the embodiment of FIG. 6, the ring 150 extends axially between and is secured to the side walls 124 to define an axially extending outer wall of the fluid chamber. The outer circular periphery of the side walls 124 is welded or brazed to the interior of the ring 150. The embodiment of the fluid coupling assembly 120 of FIG. 6 also shows a fan 62 which is normally attached to the housing of the fluid coupling assembly for moving cooling air through a radiator, or the like, to cool the engine cooling fluid, as is well known in the art. Of course, such a fan is attached to each embodiment described herein.

In the case of the center cooling sub-assembly, the axially extending wall extends between the side walls defining the fluid chamber; however, the additional cooling sub-assemblies 46 and 48 are also supported on axially extending walls 64 and 66 defined by the bearing cover portion of the housing and the outer wall of the reservoir 38. The ring of each cooling sub-assembly is secured to one of these axially extending walls 34, 64 or 66. Therefore, the housing includes a plurality of the axially extending walls 34, 64 or 66 and one of the cooling sub-assemblies is disposed on each of the three axially extending walls 34, 64 or 66.

Figures 3, 4:
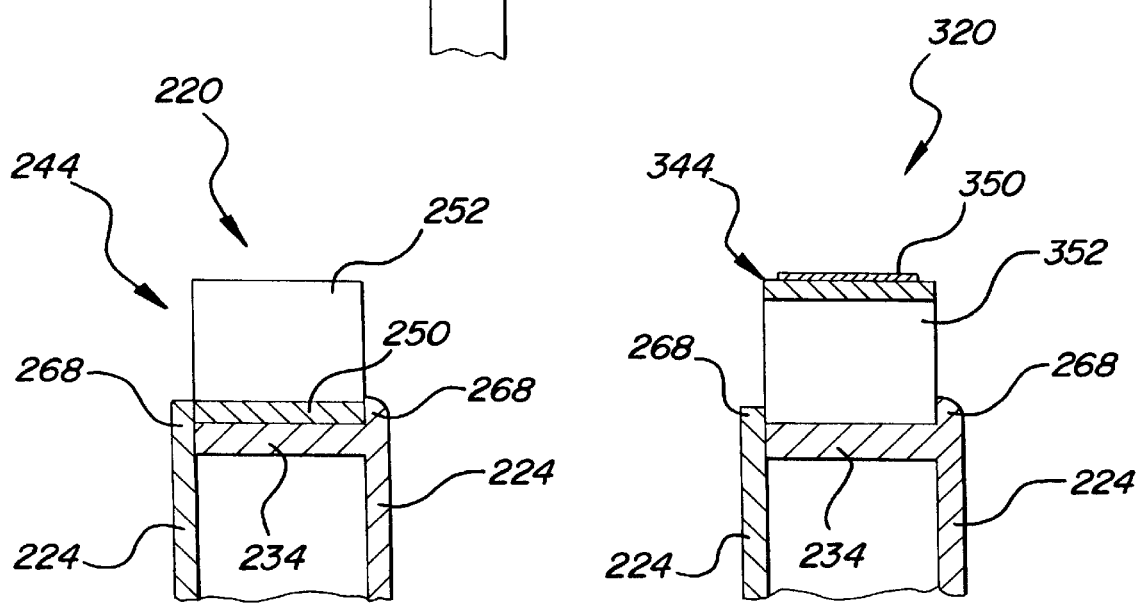
FIG. 3 is a fragmentary cross sectional view of a first alternative method of connecting the center cooling sub-assembly to the fluid coupling housing.
FIG. 4 is a fragmentary cross sectional view of a second alternative method of connecting the center cooling sub-assembly to the fluid coupling housing.
Figure 5:
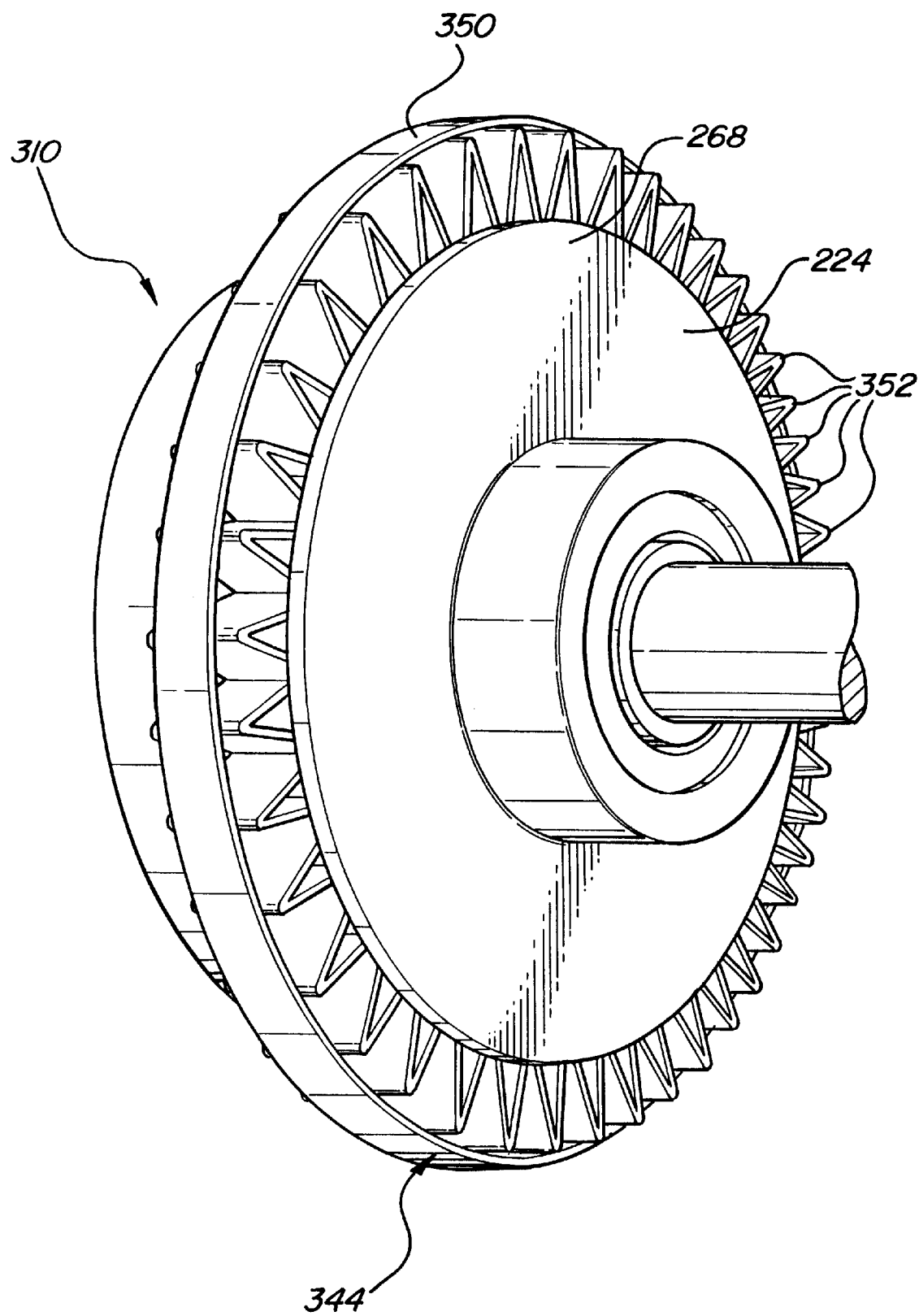
FIG. 5 is a perspective view of the cooling fin sub-assembly of FIG. 4 in combination with the fluid coupling housing.

FIGS. 3, 4 and 5 show variations wherein the side walls 224 of the housing have outer flanges 268 extending radially outwardly of the axially extending wall 234 and the cooling sub-assembly is retained between the flanges 268. In the embodiment of FIG. 3, the ring 250 of the cooling sub-assembly 244 is retained between the flanges 268. During assembly, the ring 250 is first placed on the axial outer wall 234 of the housing and thereafter, the second wall 224 is attached to the axial outer wall 234. In the embodiment of the fluid coupling assembly 220 of FIGS. 4 and 5, the cooling fins 352 of the cooling sub-assembly 344 are continuously undulated annularly about the circumference of the housing with the inner apexes retained between the flanges 268 of the housing and the outer apexes engaged by a ring 350 for retaining the sub-assembly to the housing. In this embodiment, the ring 350 may be placed around the serpentine cooling fins 352 after the cooling fins 352 are disposed between the flanges 268.

Figure 13:
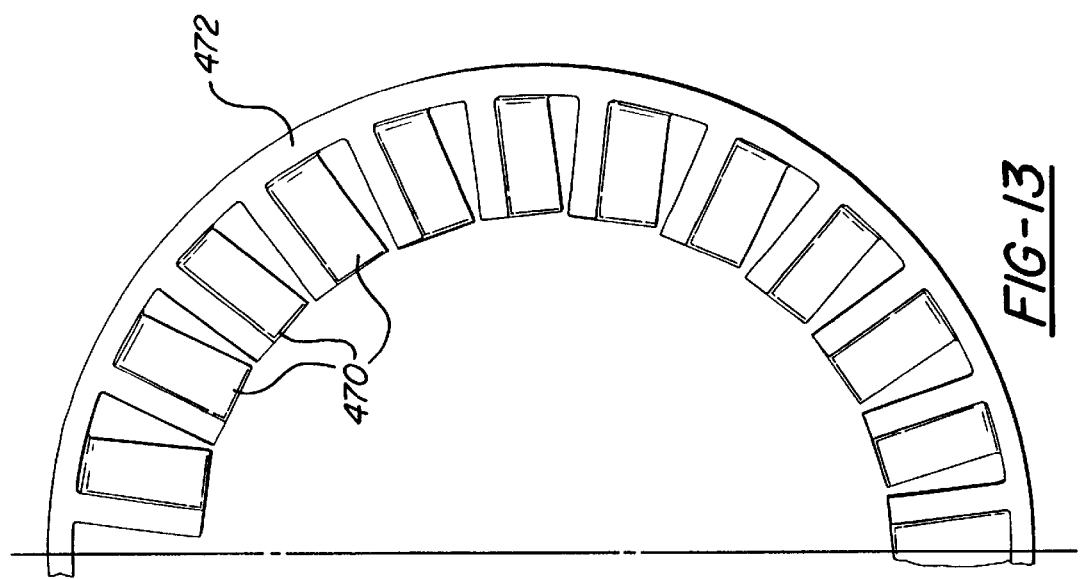
FIG. 13 is a fragmentary side view of the airfoil fins of FIG. 12.
Figure 12:
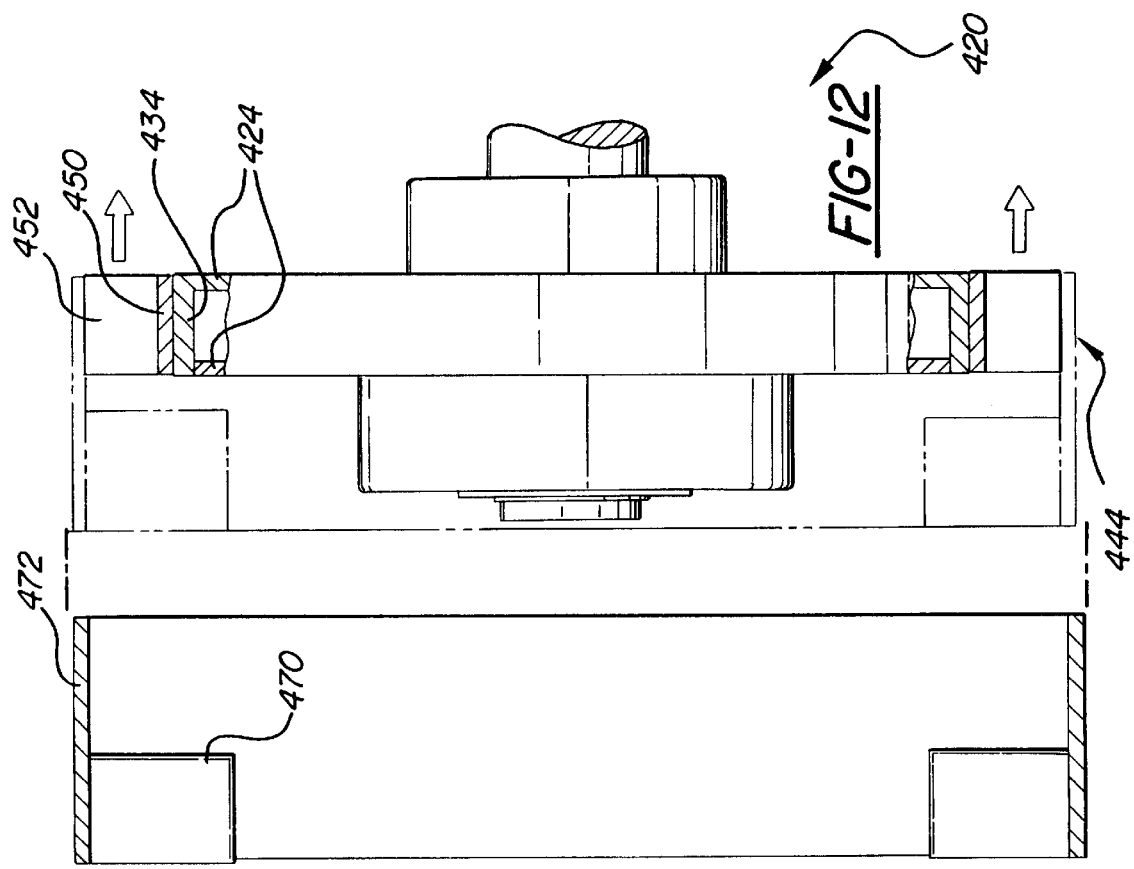
FIG. 12 is an exploded view partially in cross section showing another embodiment with a set of airfoil fins for moving air over the cooling fins.

In the embodiment of the fluid coupling assembly 420 shown in FIGS. 12 and 13, the cooling sub-assembly 444 includes a first set of cooling fins 452 extending radially from a ring 450 disposed about the housing and airfoil fins 470 disposed axially adjacent the first set of cooling fins 452 for moving air axially through the first set of cooling fins 452. The ring 450 may or may not be included but in either case another ring 472 supports and interconnects the first set of cooling fins 452 and the airfoil fins 470. In this combination, the flow of cooling air moving over the cooling fins 452 is substantially increased. As indicated in FIG. 12, the support ring 472 is integral with the airfoil fins 470 and is installed by axial movement over the cooling fins 452, to which the ring 472 may be brazed, or the like.

Figure 14:
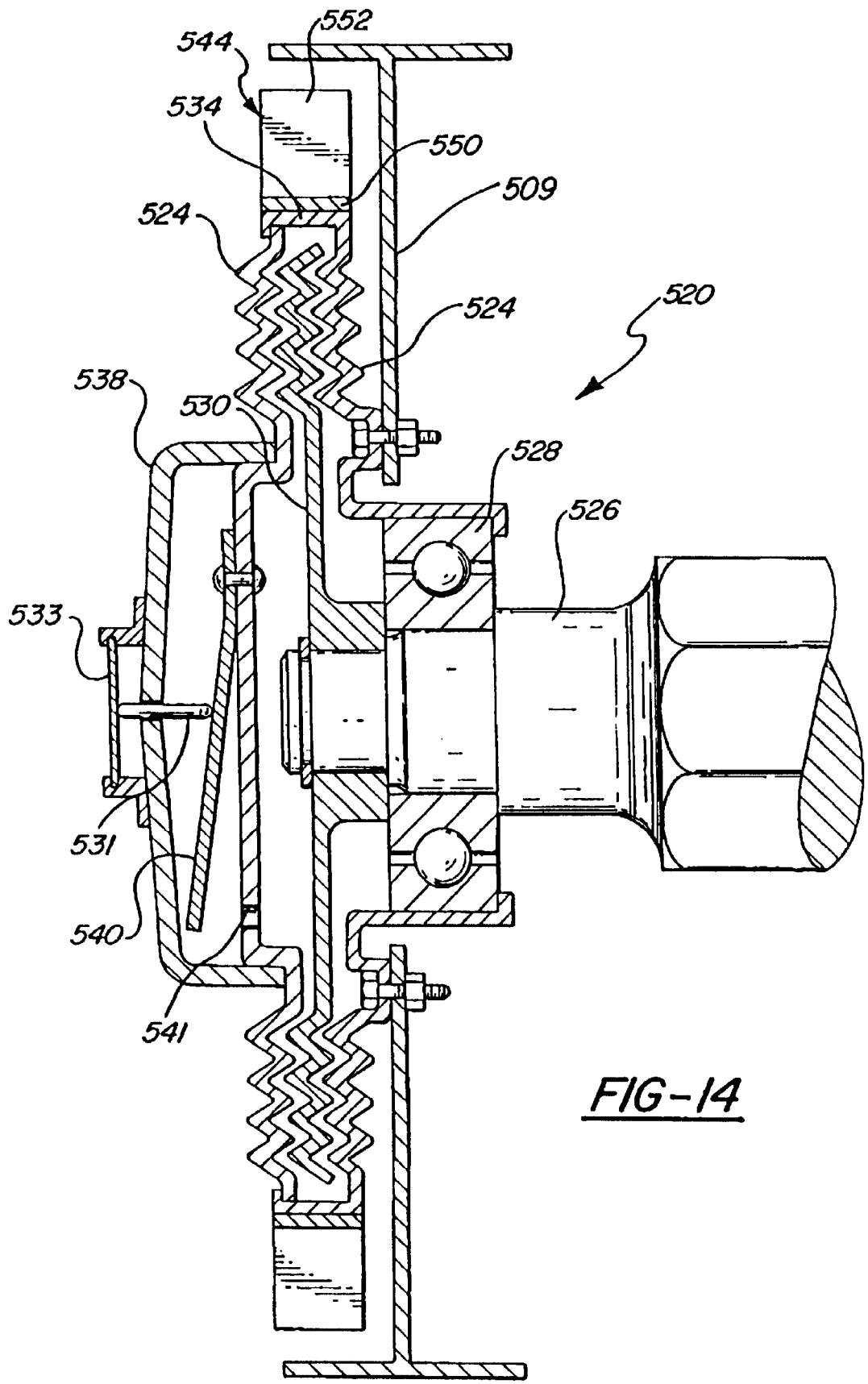
FIG. 14 is a cross sectional view of another embodiment of the invention.

FIG. 14 also shows a clutch manufactured according to the new manufacturing process which is the object of this invention.

Shaft 526 is attached to the engine and provides the input torque to the clutch. Disk 530 is locked onto the shaft 526, i.e., it always rotates at the same speed of the shaft.

The housing has side walls 524 and an axially extending annular outer wall 534, and is rotatably supported around shaft 526 by bearing 528. The front wall 524 is connecter to the rear wall 524 by a crimping process (or by fasteners around the periphery). The combination housing creates an enclosed, sealed chamber which contains the rotating disk 530 inside. The disk 530 rotates inside the chamber at a small axial distance from the walls 524 of the chamber. When this gap is filled with oil, a shearing stress is generated, which drags the housing along, making it rotate. A fan hub 509 is attached to the housing by bolts, and therefore it rotates at the same speed as the housing.

The rotational speed of the housing is proportional to the amount of fluid inside the chamber. The amount of oil is controlled by the valve 540 which opens or closes the port 541, allowing or stopping the flow of oil from the reservoir 538 to the chamber between the walls 524. This chamber is permanently being drained by an orifice (not shown) called the return, which maintains a constant flow of oil from the chamber back to the reservoir 538. The amount of oil in the chamber is the net difference between the amount entering the chamber through the port minus the amount of oil leaving the chamber through the return orifice. Therefore, if the valve closes the port, the chamber will be drained of its oil by the continuing flow of oil through the return orifice. When that happens, the housing will stop rotating or will turn at a very low speed. That condition is called a disengaged clutch.

The reservoir 538 is the spaced enclosed between the front wall 524 and the front cup 538. The position of the valve 540 is controlled by an axial pin 531 which, in turn, is controlled by a bimetal strip 533. The bimetal strip 533 is temperature-sensitive, i.e., changes in temperature will change its shape, affecting the axial position of the pin 531, and thereby causing the valve 540 to open or close the port 541.

The assembly includes a cooling sub-assembly 544 mounted in a similar fashion as the sub-assembly 44, and includes a ring 550 and cooling fins 52.

As will be appreciated from the foregoing description, the invention includes a method of fabricating a fluid coupling assembly 20, 120, 220, 320, 420 and 520 of the type including a housing having spaced side walls 24, 124, 224, 434 and 524 extending radially relative to an axis A and defining a fluid chamber surrounding a disc 30, 130 and 530 supported by a shaft 26, 526 extending through and rotatably supported by one of the side walls 24, 124, 224, 434 or 524 with cooling fins for cooling the fluid chamber. The method comprises the steps of fabricating a cooling sub-assembly 44, 46, 48, 144, 244, 246, 248, 444 and 544 by connecting cooling fins and a support member and securing the cooling sub-assembly 44, 46, 48, 144, 244, 246, 248, 444 and 544 to the housing. The method includes the step of forming the housing with an annular outer wall 34, 64, 66, 334, 434 and 534 extending axially and disposing the cooling sub-assembly 44, 46, 48, 144, 244, 246, 248, 444 and 544 about the axially extending outer wall. As illustrated, each housing is formed with a plurality of annular outer walls extending axially and disposing one of the cooling sub-assemblies 44, 46 or 48 about at least two of the axially extending outer walls. The support member is defined by forming a ring 50, 54, 58, 150, 250, 350 or 550. In most embodiments, the housing is formed with an axially extending outer wall 34, 334, 434 and 534 defining the fluid chamber with the ring 50, 250, 350 or 550 of the cooling sub-assembly secured to the axially extending outer wall; however, in one embodiment 120, the ring 150 of the cooling sub-assembly 144 is disposed between the side walls 124 to actually define the axially extending outer wall of the fluid chamber. In other words, the outer periphery of the side walls 124 abut and are brazed, or otherwise, secured to the interior of the annular ring 150. In the other embodiments, the housing has a separate outer annular wall and the ring is disposed about the axially extending outer wall of the fluid chamber. Another embodiment of FIGS. 4 and 5 is characterized by forming the side walls 224 with flanges 268 extending radially outwardly of the outer wall 234 and disposing the cooling sub-assembly 320 between the flanges. The serpentine cooling fins 352 are bound in the annular recess between the flanges 268 by the annular ring 350 which acts as a band.

In the embodiment of FIGS. 12 and 13, the support member is defined by an axially ring 472 with a first set of cooling fins 452 disposed around the ring 472, and is characterized by disposing a set of airfoil fins 470 around the ring 472 and axially spaced from the first set of cooling fins 452 for moving air through the first set of cooling fins 452.

The method is further characterized by including the steps of stamping the housing from sheet metal arid, during the stamping, forming undulations in the side walls 24, 124 and 524 of the housing with an axial extent greater than the thickness of the side walls. In other words, the walls are of a relatively thin thickness, especially when compared to a casting or forging, so that the thickness is certainly less than the axial thickness of the undulations. The undulations are illustrated as V-shaped, but may be sinuous, or the like. Similarly, the discs 30, 130 and 530 are also stamped from sheet metal with undulations in the disc which have an axial extent greater than the thickness of the discs. Furthermore, the undulations of the discs are disposed in axial overlapping relationship with the undulations of the associated side walls. In other words, there is very little clearance or space between each disc and the adjacent side wall to create high shear forces in the fluid flowing in the gaps between the adjacent undulations. Having eliminated the need to use die-casting, several processes can be used to manufacture the clutch, such as:

machining from solid stock;

forging (with or without subsequent machining);

coining (with or without subsequent machining); and others.

In other words, the parts which made up the clutch can be manufacturing using methods other than die-casting. For instance, the housing can be stamped and then machined to exact tolerances. The same thing applies to the cover, the front cup and the disk. They could also be machined from solid stock, but the amount of machining can be reduced by first stamping the approximate shape of the parts and then machining the dimensions that need more accurate tolerances. The cooling fins can be provided as a cooling jacket or cooling system mounted on top of the clutch, typically using a press-fit. Once mounted, those external fin systems can be staked or otherwise secured to prevent loosening due to vibrations, thermal changes, etc. External fin systems can be manufactured in a variety of ways, such as extrusion, stamping, etc. It is even conceivable to cast those external fin systems, because they are not critical in terms of porosity anymore. It is also conceivable to use standard fins, as conventionally used in radiators and heat exchangers in general. The standard fins can be wrapped around the clutch and secured to it with appropriate means, such as a press-fit ring. It is also conceivable to use brazing, welding, or other heat-based methods to attach the external fin system to the clutch.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fluid coupling assembly comprising;
   a housing having spaced side walls extending transversely to an axis and defining a fluid chamber,
   a shaft extending through and rotatably supported by one of said side walls,
   a disc supported by said shaft in said chamber in spaced relationship to said side walls,
   cooling fins for cooling said fluid chamber,
   said assembly characterized by a cooling sub-assembly comprising a ring extending axially as viewed in cross section, said cooling fins extending axially across said ring and generally radially of said ring, said cooling sub-assembly being secured to said housing for transmitting heat directly from said housing through said ring to said cooling fins.

2. An assembly as set forth in claim 1 wherein said ring is secured to said side walls to define an axially extending outer wall of said fluid chamber.

3. An assembly as set forth in claim 1 wherein said housing includes an axially extending wall and said cooling sub-assembly is secured to said axially extending wall.

4. An assembly as set forth in claim 3 wherein said axially extending wall extends between said side walls defining said fluid chamber.

5. An assembly as set forth in claim 4 wherein said side walls of said housing have outer flanges extending radially outwardly of said axially extending wall and said cooling sub-assembly is retained between said flanges.

6. An assembly as set forth in claim 3 wherein said ring of said cooling sub-assembly is secured to said axially extending wall.

7. An assembly as set forth in claim 3 wherein said housing includes a plurality of said axially extending walls and including one of said cooling sub-assemblies disposed on each of at least two of said axially extending walls.

8. An assembly as set forth in claim 3 wherein said cooling sub-assembly includes a first set of cooling fins extending radially from said housing and airfoil fins disposed axially adjacent said first set of cooling fins for moving air axially through said first set of cooling fins, said ring supporting said first set of cooling fins and said airfoil fins.

9. An assembly as set forth in claim 1 wherein said housing comprises stamped sheet metal components.

10. An assembly as set forth in claim 9 wherein said side walls have undulations therein.

11. A fluid coupling assembly comprising; a housing having spaced side walls extending transversely to an axis and defining a fluid chamber, a shaft extending through and rotatably supported by one of said side walls, a disc supported by said shaft in said chamber in spaced relationship to said side walls, cooling fins for cooling said fluid chamber, a cooling sub-assembly comprising a support member supporting said cooling fins on said housing, said cooling sub-assembly being secured to said housing, said housing comprising stamped sheet metal components, said side walls having undulations therein, said undulations having an axial extent and said side walls having a thickness which is less than said axial extent of said undulations.

12. An assembly as set forth in claim 11 wherein said disc includes undulations having an axial extent greater than the thickness of said disc.

13. An assembly as set forth in claim 12 wherein said undulations of said disc are sandwiched between and axially overlap said undulations of said side walls.

* * * * *